PROCESS AND APPARATUS FOR REFORMING HYDROCARBONS
Original Filed Aug. 11, 1964
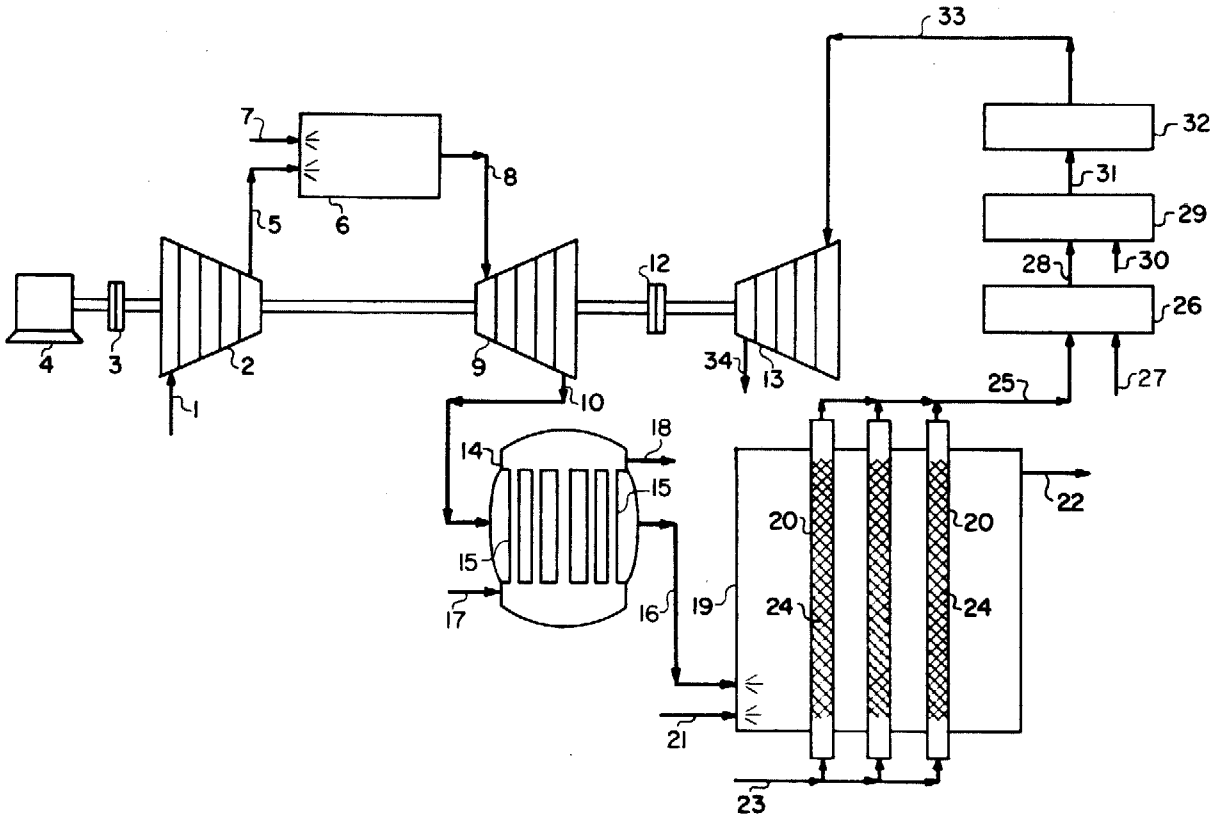
SALVATORE J. BONGIORNO
INVENTOR.
BY J. T. Clarke
AGENT United States Patent Office Re. 26,990
Reissued Nov. 24, 1970

26,990

PROCESS AND APPARATUS FOR REFORMING HYDROCARBONS

Salvatore J. Bongiorno, Oradell, N.J., assignor to Chemical Construction Corporation, New York, N.Y., a corporation of Delaware Original No. 3,446,747, dated May 27, 1969, Ser. No. 388,863, Aug. 11, 1964. Application for reissue Nov. 21, 1969, Ser. No. 889,841

Int. Cl. B01j *9/04;* C01b *2/16;* F27d *17/00*

U.S. Cl. 252—373 19 Claims

Matter enclosed in heavy brackets [ ] appears in the original patent but forms no part of this reissue specification; matter printed in italics indicates the additions made by reissue.

ABSTRACT OF THE DISCLOSURE

An improvement is provided in the high pressure production of synthesis gas containing carbon monoxide and hydrogen, which is generally produced by the catalytic primary steam reforming of a fluid hydrocarbon. The synthesis gas is produced at high pressure by compression of the gas stream in a synthesis gas compressor driven by a gas turbine. The motive power for the gas turbine is a hot gas stream which is produced by burning a fluid hydrocarbon fuel in a large excess of compressed air, and expanding the resulting hot gas stream through the gas turbine. The hot low pressure exhaust gas from the gas turbine, which contains a large proportion of unreacted air, is passed to the primary reformer furnace which produces the synthesis gas, and is employed as the combustion-supporting gas to heat the furnace. In this manner the previously wasted sensible heat in the gas turbine exhaust is recovered and usefully employed.

The present invention relates to the production of a synthesis gas principally comprising carbon monoxide and hydrogen, by the catalytic primary steam reforming of fluid hydrocarbon. The invention particularly relates to the production of highly compressed synthesis gas, which is produced by compression of the gas stream in a synthesis gas compressor driven by a gas turbine. A process and apparatus are provided, whereby the heat content in the exhaust of the gas turbine is recovered in a useful manner within primary reformer furnace. The motive power for the gas turbine is generally a hot gas stream which is produced by burning a fluid hydrocarbon fuel in compressed air, and expanding the resulting hot gas stream through the gas turbine. The gas turbine in turn is connected with and drives the synthesis gas compressor, or other power consuming device which performs useful work. In the present invention, the exhaust gas from the gas turbine, which contains excess unreacted air, is passed to the primary reformer furnace and employed as the combustion-supporting gas to heat the furnace. Thus, the sensible heat in the gas turbine exhaust is recovered and usefully employed.

The process of hydrocarbon conversion known as primary reforming is widely employed to produce synthesis gas and hydrogen. In this well-known process, a gaseous hydrocarbon such as methane is catalytically reacted with steam at elevated temperature, to produce a reformed gas mixture containing principally hydrogen and carbon monoxide, in accordance with the following reaction:

$$(1) \qquad CH_4+H_2O \rightarrow CO+3H_2$$

It will be understood that high hydrocarbons such as propane and thexane may also be catalytically reacted with steam in a similar manner, to produce a mixed carbon monoxide-hydrogen gas stream. Thus, within the context of the present invention, when referring to the catalytic steam reforming of fluid hydrocarbons, the term "fluid hydrocarbon" is meant to include not only normally gaseous hydrocarbons such as methane and propane, but also includes pre-vaporized normally liquid hydrocarbons, such as hexane or petroleum refining low-boiling fractions such as naphtha.

The overall steam reforming reaction is endothermic, and consequently the usual practice is to pass the gaseous mixture of fluid hydrocarbon and steam through an externally heated reaction tube or group of tubes. The tubes are packed with solid catalyst granules, usually consisting of activated nickel or other catalytic agent deposited on a suitable carrier. The hot product reformed gas mixture is withdrawn from the primray reformer unit and then passed to further processing. The requisite heating is usually provided by burning a fluid hydrocarbon fuel with atmospheric air inside the furnace and external to the catalyst-filled reformer tubes, since the reform reaction must be carried out at a highly elevated temperature.

The hot product reformed gas from primary steam reforming is generally further processed, either to produce ammonia synthesis gas, a mixed carbon monoxide-hydrogen gas stream for such usage as in methanol synthesis or the Fischer-Tropsch synthesis of higher hydrocarbons, and alkanols, or pure hydrogen. In any case, the reformed gas mixture from primary reforming is generally passed to secondary reforming, together with added oxygen or air, which serves to react with unconverted methane. Secondary reforming is also a catalytic process, in which the gaseous mixture is passed through a stationary bed of reform catalyst. The gas mixture from secondary reforming is then cooled in a waste heat steam boiler, and then passed to a catalytic carbon monoxide-oxidation step, in cases where pure hydrogen or ammonia synthesis gas is desired. The CO-oxidation procedure consists of the addition of steam to the process gas stream, after which the mixture is passed through a catalyst bed consisting of promoted iron oxide or other suitable catalyst. A procedure of this nature is described in U.S. Pat. No. 3,010,807. The following reaction takes place:

$$(2) \qquad CO+H_2O \rightarrow CO_2+H_2$$

The resulting gas stream is then treated to remove carbon dioxide, generally by scrubbing with an aqueous alkaline scrubbing solution containing potassium carbonate or ethanolamine, to produce a final synthesis gas stream. A typical process of this nature is shown in U.S. Pat. No. 2,886,405. It will be appreciated that some of the process steps described supra, such as CO-oxidation and carbon dioxide removal, may be omitted in suitable instances such as when the final synthesis gas stream is to be employed in methanol synthesis.

In any case, the final synthesis gas stream is compressed prior to final utilization in ammonia, methanol or Fischer-Tropsch synthesis. The compression is carried out in a synthesis gas compressor, which for purposes of the present invention will be described as being driven by a gas turbine although other motive power apparatus such as an electric motor or steam turbines may be employed in practice. The gas turbine which drives the synthesis gas compressor operates on a well-known gas turbine principle. Thus, air is compressed in an air compressor which is usually also driven by the gas turbine. The compressed air is then heated to a highly elevated temperature by the combustion of a fluid hydrocarbon fuel in the gas stream, to produce a hot gas stream which is then expanded to lower pressure and temperature through the gas turbine. The fluid hydrocarbon fuel may consist of methane, or a suitable liquid hydrocarbon such as a petroleum distillate fraction, Bunker C residual oil or even crude oil. The expansion of the hot gas stream through the gas turbine thus produces power which the gas turbine delivers by direct mechanical linkage to a suitable power consumer such as the synthesis gas compressor.

In the present invention, the hot exhaust gas from the gas turbine is employed in a useful manner to attain improved operating efficiency. This hot gas stream usually contains a large excess of unconsumed air, above the amount consumed in burning the fluid hydrocarbon fuel prior to expansion in the gas turbine. Consequently, the hot gas turbine exhaust gas has been found to be highly suitable for usage as the combustion-supporting gas for burning of the fluid hydrocarbon fuel in heating of the primary reformer furnace. Thus, in accordance with the present invention, the exhaust gas from the gas turbine, which contains excess unreacted air, is passed to the primary reformer furnace and employed as the combustion-supporting gas to heat the furnace. This is a highly advantageous procedure, in that the sensible heat in the gas turbine exhaust is recovered and usefully employed in heating of the primary reformer furnace. Thus, the fuel requirement for heating of the primary reformer furnace is substantially lowered, since it is no longer necessary to heat ambient atmospheric air up to the combustion temperature maintained in the furnace.

It is an object of the present invention to produce synthesis gas in an improved manner.

Another object is to provide a more efficient process for the primary reforming of gaseous hydrocarbons.

A further object is to combine the primary reforming of hydrocarbons with the subsequent synthesis gas compression in an improved manner.

An additional object is to efficiently utilize the exhaust gas from the gas turbine employed in synthesis gas compression.

Still another object is to reduce the fuel requirement for heating of the primary reformer furnace. Still a further object is to supply preheated combustion-supporting gas for usage in the primary reformer furnace.

These and other objects and advantages of the present invention will become evident from the description which follows. Referring to the figure, a schematic flow diagram of the various apparatus elements employed in combination in the method of the present invention is illustrated, showing process flows and co-action between the apparatus elements.

An input stream 1 consisting of ambient atmospheric air is drawn into air compressor 2. For start-up purposes, the shaft of unit 2 is connected by shaft coupling 3 to start-up motor 4, which may consist of an electric motor, steam turbine, or other motive device. The compressed air stream 5 discharged from unit 2 is preferably at a pressure in the range of 50 p.s.i.g. to 250 p.s.i.g. Stream 5 is passed into combustion vessel 6 for heating purposes, together with fluid hydrocarbon fuel stream 7 which may consist either of a normally gaseous hydrocarbon such as methane or propane or a liquid hydrocarbon such as a petroleum distillate fraction, Bunker C residual oil, or other suitable fuel. The combustion of stream 7 by reaction with stream 5 serves to raise the overall temperature of the gas stream, and a hot gas stream 8 is discharged from vessel 6, preferably at a temperature in the range of 1000° F. to 1800° F. Stream 8 will contain a considerable excess of unreacted air, thus stream 5 will be passed into vessel 6 at a rate in excess of the stoichiomertic requirement for combustion of stream 7. The ratio of stream 5 to stream 7 will preferably be such as to provide at least 10 times the stoichiometric air requirement for combustion of stream 7, thus stream 8 will typically contain about 98% excess unreacted air.

Stream 8 is now passed into gas turbine 9, and serves to drive the gas turbine 9 by expansion of the gas stream against the turbine blades in a conventional manner.

The gas stream is discharged from turbine 9 via 10 at reduced temperature and pressure, thus gas stream 10 will typically be at a reduced pressure in the range of 0.25 p.s.i.g. to 5 p.s.i.g. and temperature in the range of 400° F. to 1200° F. Gas turbine 9 is directly connected to air compressor 2, and is also connected by shaft coupling 12 to a means for power consumption, thus producing useful work. In this preferred embodiment of the present invention, gas turbine 9 is connected by shaft coupling 12 to synthesis gas compressor 13. Thus, in normal operation, gas turbine 9 drives both compressors 2 and 13.

The hot gas stream 10 is now preferably cooled by heat exchange with liquid water in steam boiler 14. Boiler 14 may optionally be either a water-tube boiler as shown, or a fire-tube boiler. The hot gas stream 10 passes around the tubes 15 of unit 14 and is cooled, being discharged as stream 16 at a reduced temperature preferably in the range of 300° F. to 800° F. Liquid boiler feed water, which is usually of condensate purity, is passed into the tubes of unit 14 via stream 17 and is vaporized in heat exchange with the hot gas stream 10 passing around the tubes 15. Steam is withdrawn from the steam drum of unit 14 via stream 18, preferably at a pressure in the range of 15 p.s.i.g. to 1000 p.s.i.g., and passed to process utilization, not shown.

Stream 16 now passes into hydrocarbon reformer furnace container 19, external to tubes 20. A fluid hydrocarbon fuel is also passed into furnace container 19 via stream 21, and is burned by reaction with stream 16. The combustion of stream 21 in furnace 19 generates a temperature preferably in the range of 1000° F. to 1800° F., and serves to heat the tubes 20, thus providing the requisite temperature level preferably in the range of 600° F. to 1500° F. for the catalytic steam reforming of fluid hydrocarbon within the tubes 20. Flue gas is withdrawn from the furnace via stream 22, and useful heat is extracted in heating process streams and in the production of steam, not shown.

A gaseous process stream 23 consisting primarily of a mixture of fluid hydrocarbon and steam is passed into the reformer tubes 20, and flows in contact with catalyst beds 24 within the tubes 20. Due to the external heating of the tubes 20, the gaseous process stream is heated preferably to the aforementioned temperature range of 600° F. to 1500° F. and catalytic steam reforming of the fluid hydrocarbon takes place. The resulting crude synthesis gas is withdrawn from tubes 20 via stream 25, and is then processed by conventional steps to produce a final synthesis gas which is then compressed to the required pressure for catalytic synthesis in synthesis gas compressor 13.

The conventional procedures for processing of the crude synthesis gas stream 25 have been shown in schematic form. Thus, stream 25 is usually initially passed to catalytic secondary reforming unit 26, together with added air which is admitted via 27 when the final synthesis gas is to be employed in ammonia synthesis. For other final usages, stream 27 may consist of oxygen. Final conversion of residual hydrocarbon takes place in unit 26, with the formation of further synthesis gas. The resulting gas stream 28 may now be passed to a waste heat boiler, not shown, and cooled with concomitant steam generation. In any case, stream 28 is next processed by passing into catalytic CO-oxidation unit 29, together with steam admitted via 30. Unit 29, the carbon monoxide content of the gas stream is reacted with steam to form carbon dioxide and hydrogen, in accordance with Equation 2 supra. In some cases, as when the final synthesis gas is to be employed in methanol synthesis, unit 29 and its function may be omitted. The gas stream next passes from unit 29 via 31 to carbon dioxide removal unit 32, which may consist of a packed tower in which the gas stream is scrubbed with an aqueous alkaline solution which absorbs carbon dioxide, as described supra. The final synthesis gas is removed from unit 32 as stream 33, and is now passed to gas compressor 13, wherein the gas stream is compressed to elevated pressure for catalytic synthesis. The compressed final synthesis gas is discharged from unit 13 via 34, and passed to a high pressure catalytic autoclave or synthesis loop, not shown.

Numerous alternatives and variations of process conditions will occur to those skilled in the art. Thus, it will be appreciated that the process ranges and conditions mentioned supra constitute merely preferred conditions for practicing the best mode of the invention, and that practical application of the invention outside of these ranges may be attained by those skilled in the art.

One alternative within the scope of the present invention consists of the elimination of steam boiler 14 and its concomitant function. In this case, gas stream 10 discharged from gas turbine 9 would be passed directly to furnace container 19 as stream 16. In this modification of the invention, stream 10 would preferably be at a somewhat lower pressure in the range of 0.1 p.s.i.g. to 3 p.s.i.g. and a temperature in the range of 400° F. to 1000° F. Other process steps and conditions and preferable operating ranges would remain essentially as disclosed supra.

In some cases essentially complete conversion of the fluid hydrocarbon by catalytic steam reforming in tubes 20 may be attained in practice, and secondary reformer 26 and its function may be omitted. Likewise, as indicated supra, units 29 and 32 and their functions may be omitted in suitable instances. In any case, the operation of units 26, 29 and 32 is conventional and thus has not been described in detail. Finally, it will be evident that gas turbine 9 may be suitably connected to other suitable means for power consumption which produce useful work, besides the synthesis gas compressor 13. Among these means for power consumption may be mentioned fluid pumps or blowers and electric generators. Other feasible usages for the power developed in gas turbine 9 will occur to those skilled in the art.

Various other process details and conventional procedures have been omitted from the figure in the interest of clarity. Thus, stream 33 may be further treated for final purification. In the case of ammonia synthesis gas, it is customary to scrub stream 33 with aqueous cuprous chloride solution to remove residual carbon monoxide. In addition, it will be appreciated that combustion vessel 6 and furnace container 19 will be suitably provided with refractory linings, not shown, in order to contain the gas streams at highly elevated temperature and prevent heat loss.

I claim:

1. Process for catalytic steam reforming of fluid hydrocarbons which comprises compressing a stream of air, heating said compressed air stream by burning a first stream of fluid hydrocarbon fuel in said compressed air stream, said compressed air stream being reacted in a proportion which is at least 10 times the stoichiometric requirement for reaction with said first stream of fluid hydrocarbon fuel whereby the resulting hot gas stream contains unreacted excess oxygen, expanding said hot gas stream through a gas turbine, whereby said hot gas stream is cooled, said gas turbine driving a gas compression means thereby producing useful work, burning a second stream of fluid hydrocarbon fuel by reaction with said gas stream while in heat exchange with a gaseous process stream comprising a mixture of fluid hydrocarbon and steam, said gaseous process stream being in contact with a catalyst, thereby catalytically reforming said gaseous process stream to form a synthesis gas stream principally containing hydrogen and carbon monoxide and compressing said synthesis gas stream in said gas compression means.

2. Process of claim 1, in which the carbon monoxide in the synthesis gas stream initially formed by catalytic reforming is at least partially reacted with additional steam in a further catalytic step to produce further hydrogen and carbon dioxide, carbon dioxide is removed from the gas stream, and the resulting final synthesis gas stream is compressed in said gas compression means.

3. Process for catalytic stream reforming of fluid hydrocarbons which comprises compressing a stream of air, heating said compressed air stream by burning a first stream of fluid hydrocarbon fuel in said compressed air stream, said compressed air stream being reacted in a proportion which is at least 10 times the stoichiometric requirement for reaction with said first stream of fluid hydrocarbon fuel whereby the resulting hot gas stream contains unreacted excess oxygen, expanding said hot gas stream through a gas turbine, whereby said hot gas stream is cooled, said gas turbine driving a gas compression means thereby producing useful work, further cooling said gas stream by heat exchange with liquid water whereby said liquid water is vaporized to generate steam, burning a second stream of fluid hydrocarbon fuel by reaction with the further cooled gas stream while in heat exchange with a gaseous process stream comprising a mixture of fluid hydrocarbon and steam, said gaseous process steam being in contact with a catalyst, thereby catalytically reforming said gaseous process stream to form a synthesis gas stream principally containing hydrogen and carbon monoxide and compressing said synthesis gas stream in said gas compression means.

4. Process of claim 3, in which the carbon monoxide in the synthesis gas stream initially formed by catalytic reforming is at least partially reacted with steam in a further catalytic step to produce further hydrogen and carbon dioxide, carbon dioxide is removed from the synthesis gas stream, and the resulting final synthesis gas streams is compressed in said gas compression means.

5. Process of claim 3, in which said gas turbine also drives air compression means which produces said compressed air stream.

6. Process for catalytic steam reforming of fluid hydrocarbons which comprises compressing a stream of air to a pressure in the range of 50 p.s.i.g. to 250 p.s.i.g., heating said compressed air stream to a temperature in the range of 1000° F. to 1800° F. by burning a first stream of fluid hydrocarbon fuel in said compressed air stream, said compressed air stream being reacted in a proportion which is at least 10 times the stoichiometric requirement for reaction with said first stream of fluid hydrocarbon fuel, whereby the resulting hot gas stream contains unreacted excess oxygen, expanding said hot gas stream through a gas turbine to a pressure in the range of 0.1 p.s.i.g. to 3 p.s.i.g., whereby said hot gas stream is cooled to a temperature in the range of 400° F. to 1000° F., said gas turbine driving gas compression means thereby producing useful work, burning a second stream of fluid hydrocarbon fuel by reaction with said gas stream, thereby heating said gas stream to a temperature in the range of 1000° F. to 1800° F., while in heat exchange with a gaseous process stream comprising a mixture of fluid hydrocarbon and steam, said gaseous process stream being in contact with a catalyst, thereby heating said gaseous process stream to a temperature in the range of 600° F. to 1500° F. and catalytically reforming said gaseous process stream to form a synthesis gas stream principally containing hydrogen and carbon monoxide, and compressing said synthesis gas stream in said gas compression means.

7. Process of claim 6, in which the resulting hot gas stream produced by burning said first stream of fluid hydrocarbon fuel in said compressed air stream contains about 98% by volume of unreacted air.

8. Process of claim 6, in which the carbon monoxide in the synthesis gas stream initially formed by catalytic reforming is at least partially reacted with steam in a further catalytic step to produce further hydrogen and carbon dioxide, carbon dioxide is removed from the synthesis gas stream, and the resulting final synthesis gas stream is compressed in said gas compression means.

9. Process for catalytic steam reforming of fluid hydrocarbons which comprises compressing a stream of air to a pressure in the range of 50 p.s.i.g. to 250 p.s.i.g., heating said compressed air stream to a temperature in the range of 1000° F. to 1800° F. by burning a first stream of fluid hydrocarbon fuel in said compressed air stream, said compressed air stream, being reacted in a proportion which is at least 10 times the stoichiometric requirement for reaction with said first stream of fluid hydrocarbon fuel, whereby the resulting hot gas stream contains unreacted excess oxygen, expanding said hot gas stream through a gas turbine to a pressure in the range of 0.25 p.s.i.g. to 5 p.s.i.g., whereby said hot gas steam is cooled to a temperature in the range of 400° F. to 1200° F., said gas turbine driving a gas compression means thereby producing useful work, further cooling said gas stream to a temperature in the range of 300° F. to 800° F. by heat exchange with liquid water whereby said liquid water is vaporized to generate steam at a pressure in the range of 15 p.s.i.g. to 1000 p.s.i.g., burning a second stream of fluid hydrocarbon fuel by reaction with the further cooled gas stream, thereby heating said gas stream to a temperature in the range of 1000° F. to 1800° F., while in heat exchange with a gaseous process stream comprising a mixture of fluid hydrocarbon and steam, said gaseous process stream being in contact with a catalyst, thereby heating said gaseous process stream to a temperature in the range of 600° F. to 1500° F. and catalytically reforming said gaseous process stream to form a synthesis gas stream principally containing hydrogen and carbon monoxide, and compressing said synthesis gas stream in said gas compression means.

10. Process of claim 9, in which the carbon monoxide in the synthesis gas stream initially formed by catalytic reforming is at least partially reacted with steam in a further catalytic step to produce further hydrogen and carbon dioxide, carbon dioxide is removed from the synthesis gas stream, and the resulting final synthesis gas stream is compressed in said compression means.

11. Process of claim 9, in which said gas turbine also drives air compression means which produces said compressed air stream.

12. Process of claim 9, in which the resulting hot gas stream produced by burning said first stream of fluid hydrocarbon fuel in said compressed air stream contains about 98% by volume of unreacted air.

13. Apparatus for catalytic steam reforming of fluid hydrocarbons which comprises an air compressor, a combustion vessel, means to pass compressed air from said air compressor to said combustion vessel, means to pass a first stream of fluid hydrocarbon fuel to said combustion vessel whereby said first stream of fluid hydrocarbon fuel is burned in said compressed air stream and a hot gas stream containing a large excess of unconsumed air is produced, a gas turbine, means to pass said hot gas stream from said combustion vessel to said gas turbine whereby said hot gas stream is expanded and cooled in said gas turbine, said gas turbine driving a gas compressor thereby producing useful work, a hydrocarbon reformer furnace, said gas turbine, said gas turbine driving a gas compresformer tubes disposed in a furnace container, said container being provided with fluid hydrocarbon combustion means external to said tubes, means to pass said gas stream from said gas turbine into said furnace container and external to said tubes, means to pass a second stream of fluid hydrocarbon fuel to said combustion means in said furnace container, whereby said fluid hydrocarbon fuel is burned by reaction with said gas stream and said tubes are heated, means to pass a gaseous process stream comprising a mixture of fluid hydrocarbon and steam through said tubes, means to remove a catalytically-formed initial synthesis gas stream principally containing hydrogen and carbon monoxide from said tubes, means to convert said initial synthesis gas stream to a final synthesis gas stream, and means to pass said final synthesis gas stream into said gas compressor, whereby said final synthesis gas stream is compressed in said gas compressor and discharged from said gas compressor at elevated pressure.

14. Apparatus for catalytic steam reforming of fluid hydrocarbons which comprises an air compressor, a combustion vessel, means to pass compressed air from said air compressor to said combustion vessel, means to pass a first stream of fluid hydrocarbon fuel to said combustion vessel whereby said first stream of fluid hydrocarbon fuel is burned in said compressed air stream and a hot gas stream containing a large excess of unconsumed air is produced, a gas turbine, means to pass said hot gas stream from said combustion vessel to said gas turbine whereby said hot gas stream is expanded and cooled in said gas turbine, said gas turbine driving a gas compressor thereby producing useful work, a steam boiler, means to pass liquid water to said steam boiler, means to remove generated steam from said steam boiler, means to pass said gas stream from said gas turbine to said steam boiler, whereby said gas stream is further cooled in said steam boiler in heat exchange with liquid water, a hydrocarbon reformer furnace, said furnace comprising a plurality of catalyst-filled reformer tubes disposed in a furnace container, said container being provided with fluid hydrocarbon combustion means external to said tubes, means to pass said gas stream from said steam boiler into said furnace container and external to said tubes, means to pass a second stream of fluid hydrocarbon fuel to said combustion means in said furnace container, whereby said fluid hydrocarbon fuel is burned by reaction with said gas stream and said tubes are heated, means to pass a gaseous process stream comprising a mixture of fluid hydrocarbon and steam through said tubes, means to remove a catalytically-formed initial synthesis gas stream principally containing hydrogen and carbon monoxide from said tubes, means to convert said initial synthesis gas stream to a final synthesis gas stream, and means to pass said final synthesis gas stream into said gas compressor, whereby said final synthesis gas stream is compressed in said compressor and discharged from said gas compressor at elevated pressure.

15. Apparatus of claim 14, in which said gas turbine is connected with and also drives said air compressor.

*16. A process for catalytic steam reforming of fluid hydrocarbons to produce synethesis gas which comprises compressing a stream of air, heating said compressed air stream by burning a first stream of fluid hydrocarbons fuel in said compressed air stream, said compressed air stream being reacted in a proportion which is at least 10 times the stoichiometric requirement for reaction with said first stream of fluid hydrocarbon fuel whereby the resulting hot gas stream contains unreacted excess oxygen, expanding said hot gas stream through a gas turbine, whereby said hot gas stream is cooled, said gas turbine driving a gas compression means thereby producing useful work, burning a second stream of fluid hydrocarbon fuel by reaction with said gas stream while in heat exchange with a gaseous process stream comprising a mixture of fluid hydrocarbon and steam, said gaseous process stream being in contact with a catalyst, thereby catalytically reforming said gaseous process stream to form a synthesis gas stream principally containing hydrogen and carbon monoxide, and compressing a process gas stream of the synthesis gas process in said gas compression means.*

*17. The process of claim 16, in which said process gas stream compressed in said gas compression means is said stream of air.*

*18. An apparatus for catalytic steam reforming of fluid hydrocarbons to produce synthesis gas which comprises an air compressor, a combustion vessel, means to pass compressed air from said air compressor to said combus-*

*tion vessel, means to pass a first stream of fluid hydrocarbon fuel to said combustion vessel whereby said first stream of fluid hydrocarbon fuel is burned in said compressed air stream and a hot gas stream containing a large excess of unconsumed air is produced, a gas turbine, means to pass said hot gas stream from said combustion vessel to said gas turbine whereby said hot gas stream is expanded and cooled in said gas turbine, said gas turbine driving a gas compressor thereby producing useful work, a hydrocarbon reformer furnace, said furnace comprising a plurality of catalyst-filled reformer tubes disposed in a furnace container, said container being provided with fluid hydrocarbon combustion means external to said tubes, means to pass said gas stream from said gas turbine into said furnace container and external to said tubes, means to pass a second stream of fluid hydrocarbon fuel to said combustion means in said furnace container, whereby said fluid hydrocarbon fuel is burned by reaction with said gas stream and said tubes are heated, means to pass a gaseous process stream comprising a mixture of fluid hydrocarbon and steam through said tubes, means to remove a catalytically-formed initial synthesis gas stream principally containing hydrogen and carbon monoxide from said tubes, means to convert said initial synthesis gas stream to a final synthesis gas stream, and means to pass a process gas stream*

*of the synthesis gas process into said gas compressor, whereby said process gas stream is compressed in said gas compressor and discharged from said gas compressor at elevated pressure.*

*19. The apparatus of claim 18, in which said gas turbine is connected with and also drives said air compressor.*

References Cited

The following references, cited by the Examiner, are of record in the patented file of this patent or the original patent.

UNITED STATES PATENTS

| | | | |
|---|---|---|---|
| 2,662,004 | 12/1953 | Gaucher | 48—196 |
| 3,081,268 | 3/1963 | Marshall | 252—376 |
| 3,241,933 | 3/1966 | Ploum et al. | 48—196 |

OTHER REFERENCES

German printed application, No. 1,102,112, March 1961.

JOSEPH SCOVRONEK, Primary Examiner

U.S. Cl. X.R.

23—212, 213, 260, 288; 48—196, 214; 260—449.5

C-127-A

PO-1050
(5/69)

UNITED STATES PATENT OFFICE
CERTIFICATE OF CORRECTION

Patent No. REISSUE 26,990 Dated November 24, 1970

Inventor(s) Salvatore J. Bongiorno

It is certified that error appears in the above-identified patent and that said Letters Patent are hereby corrected as shown below:

Claim 13 line 14 (at col. 7 line 62); delete

"gas turbine, said gas turbine driving a gas compres-"

and read

"furnace comprising a plurality of catalyst-filled re-"

Claim 16 line 2 (at col. 8 line 48): delete

"synethesis" and read "synthesis".

Also Claim 16 line 4 (at col. 8 line 50); delete "hydrocarbons" and read "hydrocarbon".

SIGNED AND
SEALED
MAR 2 1971

(SEAL)
Attest:

Edward M. Fletcher, Jr.
Attesting Officer

WILLIAM E. SCHUYLER, JR.
Commissioner of Patents